United States Patent
Li et al.

(10) Patent No.: US 10,909,242 B2
(45) Date of Patent: Feb. 2, 2021

(54) SYSTEM AND METHOD FOR DETECTING SECURITY RISKS IN A COMPUTER SYSTEM

(71) Applicant: NEC Laboratories America, Inc., Princeton, NJ (US)

(72) Inventors: Ding Li, West Windsor, NJ (US); Xusheng Xiao, Cleveland, OH (US); Zhichun Li, Princeton, NJ (US); Guofei Jiang, Princeton, NJ (US); Peng Gao, Fort Lee, NJ (US)

(73) Assignee: NEC Corporation

( * ) Notice: Subject to any disclaimer, the term of this patent is extended or adjusted under 35 U.S.C. 154(b) by 185 days.

(21) Appl. No.: 16/169,081

(22) Filed: Oct. 24, 2018

(65) Prior Publication Data

US 2019/0121973 A1 Apr. 25, 2019

Related U.S. Application Data

(60) Provisional application No. 62/576,703, filed on Oct. 25, 2017.

(51) Int. Cl.
*G06F 21/55* (2013.01)
*G06F 9/54* (2006.01)
(Continued)

(52) U.S. Cl.
CPC ............ *G06F 21/554* (2013.01); *G06F 9/542* (2013.01); *G06F 16/24568* (2019.01);
(Continued)

(58) Field of Classification Search
CPC ................. G06F 21/554; G06F 21/577; G06F 16/24568; G06F 16/3335; G06F 9/542; G06F 21/552
(Continued)

(56) References Cited

U.S. PATENT DOCUMENTS 8,423,576 B2 4/2013 Drissi et al.
8,661,014 B2 2/2014 Chen et al.
(Continued)

OTHER PUBLICATIONS

Arasu et al., "The CQL continuous query language: semantic foundations and query execution", The VLDB Journal, Jul. 2005, pp. 121-142, (2006) 15(2).

(Continued)

*Primary Examiner* — Mohammad W Reza
(74) *Attorney, Agent, or Firm* — Joseph Kolodka (57) ABSTRACT

A system and method are provided for identifying security risks in a computer system. The system includes an event stream generator configured to collect system event data from the computer system. The system further includes a query device configured to receive query requests that specify parameters of a query. Each query request includes at least one anomaly model. The query request and the anomaly model are included in a first syntax in which a system event is expressed as {subject-operation-object}. The system further includes a detection device configured to receive at least one query request from the query device and continuously compare the system event data to the anomaly models of the query requests to detect a system event that poses a security risk. The system also includes a reporting device configured to generate an alert for system events that pose a security risk detected by the detection device.

20 Claims, 4 Drawing Sheets

(51) Int. Cl.
    *G06F 16/33* (2019.01)
    *G06F 21/57* (2013.01)
    *G06F 16/2455* (2019.01)
(52) U.S. Cl.
    CPC ........ *G06F 16/3335* (2019.01); *G06F 21/552* (2013.01); *G06F 21/577* (2013.01)
(58) Field of Classification Search
    USPC .......................................................... 726/22
    See application file for complete search history.

(56) References Cited

U.S. PATENT DOCUMENTS

| | | | | |
|---|---|---|---|---|
| 2016/0191548 | A1* | 6/2016 | Smith | G06F 21/565 726/23 |
| 2017/0134407 | A1* | 5/2017 | Mason | H04L 63/1416 |

OTHER PUBLICATIONS

Barcel'O et al., "Expressive Languages for Path Queries over Graph-Structured Data", PODS'10, Jun. 2010, pp. 1-12.
Bianco et al., "SyQL: an Object Oriented, Fuzzy, Temporal Query Language for Repositories of Software Artifacts", OOPSLA'08, Oct. 2008, pp. 715-716.
Cruz et al., "A Graphical Query Language Supporting Recursion", ACM, May 1987, pp. 323-330.
Imamura et al., "A Stream Query Language TPQL for Anomaly Detection in Facility Management", IDEAS '12, Aug. 2012, pp. 235-238.
Tian et al., "NeuroQL: A Domain-Specific Query Language for Neuroscience Data", EDBT 2006 Workshops, LNCS 4254, Mar. 2006, pp. 613-624.
Zong et al., "Behavior Query Discovery in System-Generated Temporal Graphs", Proceedings of the VLDB Endowment, Dec. 2015, pp. 240-251, vol. 9, No. 4.

* cited by examiner

SYSTEM AND METHOD FOR DETECTING SECURITY RISKS IN A COMPUTER SYSTEM

RELATED APPLICATION INFORMATION

This application claims priority to provisional application Ser. No. 62/576,703, filed on Oct. 25, 2017, incorporated herein by reference.

BACKGROUND

Technical Field

The present invention relates to computer systems, and more particularly, systems for detecting security risks in a computer system.

Description of the Related Art

Computer security is extremely important for protection of sensitive data in a computer system or network. Current systems for detecting risky behaviors in a computer system based on querying data are not able to query continuous streaming data. Existing computer security systems are also unable to employ a plurality of different queries at the same time. Furthermore, existing computer security systems include query languages that are verbose and inefficient.

SUMMARY

According to an aspect of the present invention, a system is provided for identifying security risks in a computer system. The system includes an event stream generator configured to collect system event data from the computer system. The system further includes a query device configured to receive query requests that specify parameters of a query. Each query request includes at least one anomaly model. The query request and the anomaly model are included in a first syntax in which a system event is expressed as {subject-operation-object}. The system further includes a detection device configured to receive at least one query request from the query device and continuously compare the system event data to the anomaly models of the query requests to detect a system event that poses a security risk. The system also includes a reporting device configured to generate an alert for system events that pose a security risk detected by the detection device.

According to another aspect of the present invention, a computer-implemented method is provided for identifying security risks in a computer system. The method includes collecting system event data from the computer system. The method further includes receiving query requests that specify parameters of a query. Each query request includes at least one anomaly model. The query request and the anomaly model are included in a first syntax in which a system event is expressed as {subject-operation-object}. The method also includes comparing the system event data to the anomaly models of the query requests to detect a system event that poses a security risk. The method additionally includes generating an alert for system events that pose a security risk.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for detecting security risks in a computer system. The systems and methods are configured to continuously monitor a variety of query requests and compare the system event data for the computer system to anomaly models to detect risky behavior. The system utilizes a syntax which is concise and efficient to execute. The system also permits detection of complex event patterns and may utilize models that implement stateful computation.

Embodiments described herein may be entirely hardware, entirely software or may include both hardware and software elements which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
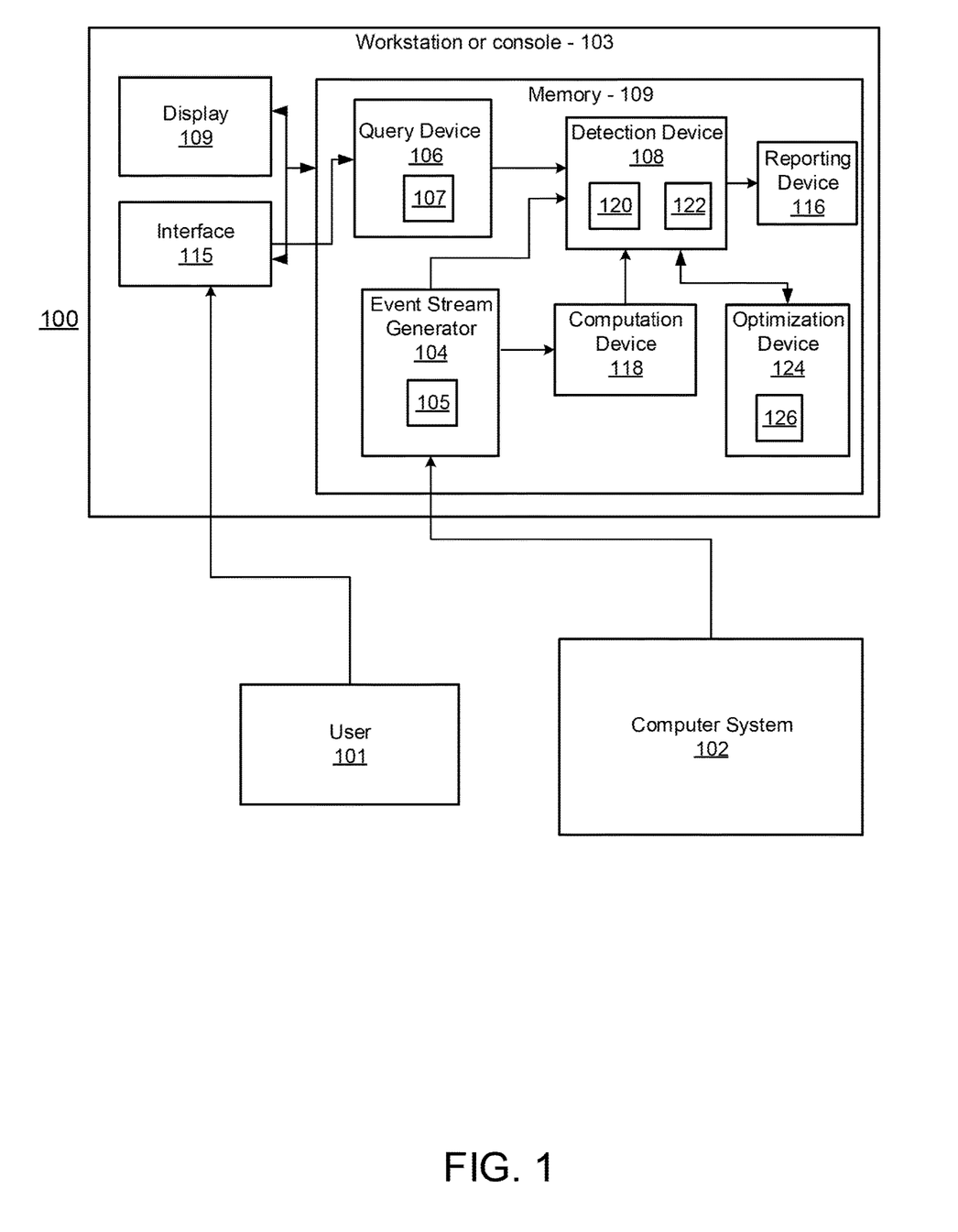
FIG. 1 is a block/flow diagram illustratively depicting a framework for a system for detecting security risks in a computer system, in accordance with an embodiment of the present invention.

Referring now to FIG. 1, a block/flow diagram illustratively depicting the system 100 for identifying security risks in a computer system 102 is shown in accordance with one embodiment of the present principles. The computer system 102 may be a computer network or other computer systems known in the art. The system 100 includes an event stream generator 104. The event stream generator 104 is configured to collect data concerning system events from system entities and generate an event stream in real time. The system 100 may include one or more monitoring agents known in the art to collect the system data from servers, desktops and laptops of the computer system 102 concerning the activities of the devices and send the data to the event stream generator. The system entities may be files, network connections and processes. A system event may be an interaction among the system entities. For example, system events may include process creation and destruction, file access or network access.

In one embodiment, the system event data 105 collected by the event stream generator 104 may be information from system calls from kernels. System calls from kernels provide a comprehensive way to capture the behavior of the computer system 100 by capturing all activities among system entities over time.

The system 100 includes a query device 106 that is configured to receive at least one query request 107. In a preferred embodiment, the query device 106 is configured to receive the query request from the user 101. The system 100 may include a workstation 103 or console for inputting query requests 107 into the query device 106. The workstation 103 may include a display 112 and an interface 114 which may include a keyboard, mouse, a joystick, a haptic device, or any other peripheral to permit the user 101 to input a query request 107 to the query device 106. The system may also include memory 109 and a processor(s) for executing the system processes described herein. While the system 100 illustratively shows a query request 107 received from a user, in some embodiments query requests may also be generated automatically by the system.

The query device 106 is specifically configured to receive a query request 107 having a syntax wherein a system event is expressed in the form of {subject-operation-object}. The syntax may be referred to herein as a Stream Temporal Behavioral Query Language ("STBQL") syntax. For example, the system event may be expressed as "proc p1, write, file f1" where the system entities are represented as subjects (proc p1), objects (file f1) and interactions are represented as operations initiated by subjects and targeted on objects. The query request 107 specifies parameters of a query that will be performed by a detection device 108. The query request 107 also includes at least one anomaly model 110. As explained herein, the syntax for the query request also provides concise and explicit constructs to specify system entities and events, as well as entity attributes and event relationships. In one embodiment, the query device 106 is configured to provide syntax shortcuts to make queries more concise and to provide default values if certain fields are omitted in the query request.

Figure 2:
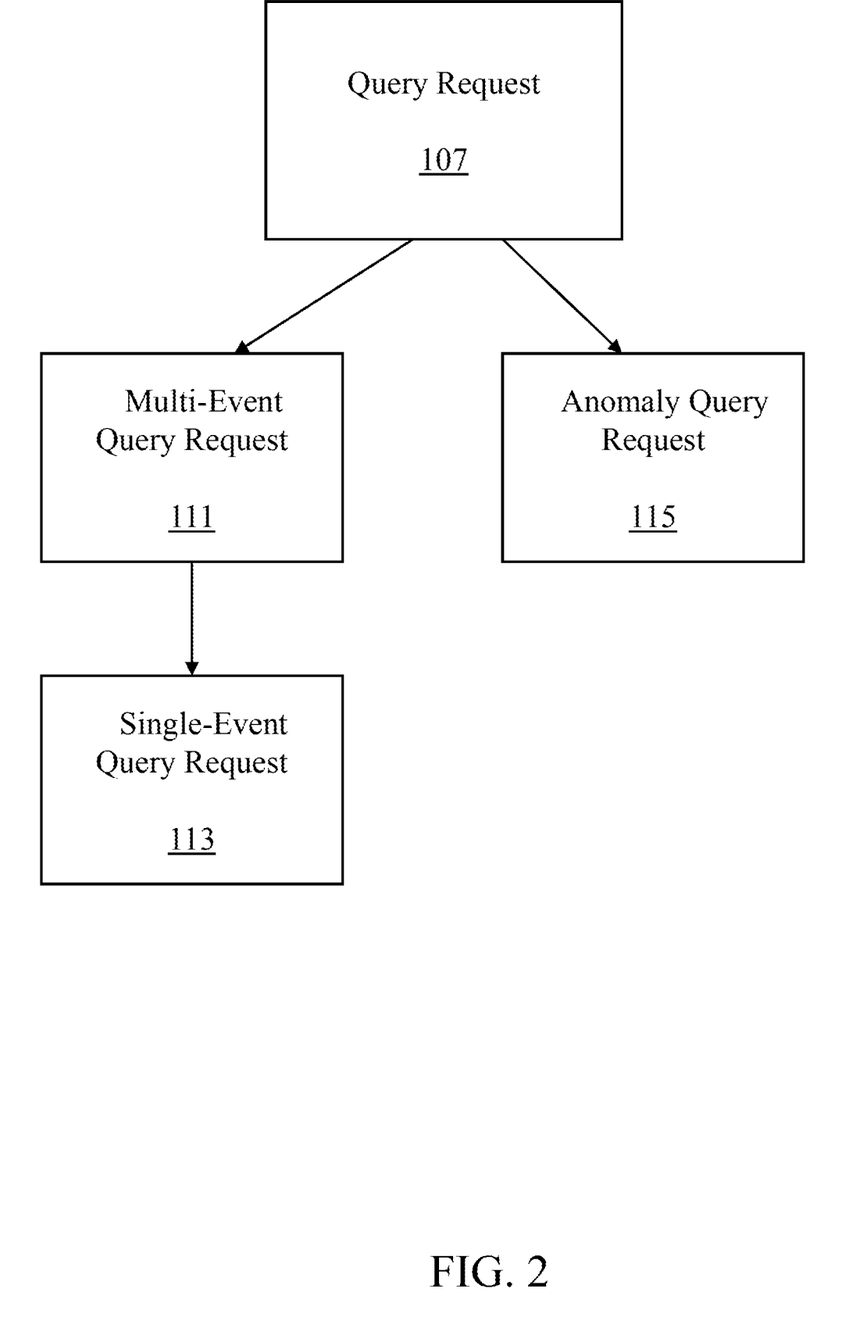
FIG. 2 is a flow diagram illustratively depicting query requests that the query device is configured to receive, in accordance with an embodiment of the present invention.

As shown in FIG. 2, the query device 106 may be configured to receive query requests that are a single-event query 113 or a multi-event query 111. The query device is also configured to receive an anomaly query request 115.

The STBQL syntax is configured to permit the query request 107 to specify parameters of a model for a multi-event query.

The anomaly model 110 in the query request 107 that is received by the query device 106 may include event temporal relationship constraints. Event temporal relationship constraints specify the temporal dependency of event patterns. For example, the query request may specify that event 1 must occur first, then subsequently event 2 and finally event 3 (e.g., evt1→evt2→evt3). The temporal relationship constraints in the anomaly model may also specify the temporal distance between events (e.g., evt1→[1-2 min] evt 2→[1-2 min] evt 3) for the system event data.

The model 110 in the query request may also specify system event patterns, including the subject/object entity, event operation, event ID. The model 110 may also specify sliding windows which limit the system event data to a specific temporal time. For example, in one embodiment the anomaly model may have a sliding window that specifies a 10-minute sliding time window (e.g., #time(10 min)).

The model 110 in the query request 107 that is received by the query device 106 may also specify global constraints for the model. The global constraints specify the constraints for all event patterns in the system event data. For example, in one embodiment, the global constraint may specify that all event patterns occur on the same enterprise host. While the models 110 may be generally referred to as "anomaly models", such models may specify specific system events and/or anomalies.

In one embodiment, the query device 106 is configured to receive a query request 107 that includes an anomaly model 110 which specifies a rule-based anomaly. For example, an advanced cyberattack may include a series of steps that exploit vulnerabilities across multiple systems in the computer system 100. The downloading and execution of a gsecdump.exe file may be one form of such advanced cyberattack.

In one example, a query request for monitoring the download and execution of a gsecdump.exe file may include a model specifying the events of (i) reading the network, (ii) creating the downloaded file and (iii) executing the downloaded file. The query request 107 may also specify a temporal relationship between the timing of the events.

As an example, the query request 107 for the gsecdump.exe file may be as follows:

---
1 proc p1 read || write ip i1[srcport!= "internal_address"] as evt1
2 proc p2 write file f1["gsecdump"] as evt2
3 proc p3 start proc p4["gsecdump"] as evt3
4 with evt1 -> evt2 -> evt3
5 report p1, i1, p2, f1, p3, p4 // p1 -> p1.exe_name, i1 -> i1.dst_ip, f1 -> f1.name

---

The system 100 includes a detection device 108 that is configured to receive a query request 107 from the query device 106 and compare the system event data 105 to the anomaly model 110 to detect a system event that poses a security risk. In a preferred embodiment, the detection device 108 is configured to continuously compare the system event data 105 to the anomaly model 110 after receiving the query request 107 from the query device 106.

For example, in the embodiment that includes a query request 107 for the gsecdump.exe file, the detection device 108 is configured to obtain the query request for the gsecdump.exe file and continuously compare the event stream data to the rule-based model specified in the query request.

The query request 107 may further includes rules for generating a signal to generate a report based on the comparison of the event stream to the model.

The detection device 108 is configured to send a signal to the reporting device 116 when the comparison between the anomaly model 110 and the system event data 105 indicates a system event that poses a security risk. The reporting device 116 is configured to generate an alert to a user 101 for detected system events that pose a security risk. The detection device 108 alert may be configured to generate an alert in the form of a message or symbol displayed on the display 112. In alternative embodiments, the reporting device 116 may be configured to generate an audible alarm, trigger a visible warning device such as a light or provide other feedback to alert the user of the risky system events.

The system may also include a computation device 118. The computation device 118 is configured to analyze the system event data 105 from the event stream generator 104 and compute values concerning the system event data. The computation device 118 is configured to provide stateful computation to compute state values, such as, sum, average, minimum, maximum, count, distinct count, median, percentile, standard deviation, etc. The computation device 124 may also include aggregation functions to aggregate the data in sets or multisets. The data determined by the computation device 118 is considered herein as a type of system event data 105.

In another embodiment, the query device 106 is configured to receive a query request 107 that includes a time-series anomaly. In this embodiment, the query request 107 includes a time-series model which is compared to system event data 105, such as state data computed by the computation device 118 over a specific temporal period, such as a specified sliding window. For example, the detection device 108 may be configured to receive a query request 107 that includes a time-series anomaly and continuously monitor and detect large increases of the amount of data sent out by certain process in the system 102. In one embodiment, the query request 107 for monitoring for network spikes may be as follows:

```
1 proc p write ip i as evt #time(10 min)
2 state[3] ss {
3 avg_amount := avg(evt.amount)
4 } group by p
5 alert (ss[0].avg_amount > (ss[0].avg_amount + ss[1].
    avg_amount + ss[2].avg_amount) / 3) && (ss[0].
    avg_amount > 10000)
6 report p, ss[ss[0].avg_amount, ss[1].avg_amount, ss[2].
    avg_amount
```

In this embodiment, the query request includes a 10-sliding window. The computation device 118 may determine the amount of data collected and an average amount of data collected. The detection device 108 is configured to receive moving average of data collected by the event stream generator 104 from the computation device 118.

The query request 107 may further includes an anomaly model 110 which specifies a threshold that is exceeded for the average data collected. The query request may include rules specifying when a signal should be sent to the reporting device 116 for generating an alert for detected system events that pose a security risk.

In another embodiment, the query device 106 is configured to receive a query request 107 that includes an invariant-based anomaly model. In this embodiment, the detection device 108 further includes a training device 120. The training device 120 is configured to receive a query request 107 and perform a query during a training period. The training device 120 is configured to detect invariants during the training period and the training device saves the invariants as an anomaly model 110. The detection device 108 is then configured to continuously compare the system event data for the determined invariants. The determined invariants are preferably based on state data determined by the computation device 118.

For example, the query request 107 received by the training device 120 may be as follows:

```
1 proc p1["%apache.exe"] start proc p2 as evt#time(10 s)
2 state ss {
3 set_proc := set(p2.exe_name)
4 } group by p1
5 invariant[10][offline] {
6 a := empty_set // invariant init
7 a = a union ss.set_proc //invariant update
8 }
9 alert |ss.set_proc diff a| > 0
10 report p1, ss.set_proc
```

In another embodiment, the query device 106 is configured to receive a query request 107 that includes an outlier-based anomaly model. The detection device 108 is configured to receive this query request and detect abnormal system behavior through comparison of peer processes with each other. In this embodiment, the detection device 118 further includes an identification device 122. The identification device 122 is configured to determine based on constructs specified in the query request 107 which data in a time window forms a point. The query request 107 may also specify the manner in which distances among the points should be computed by the identification device 122.

The identification device 122 may further receive the amount of data sent through the network by a process for each outgoing IP address determined by the computation device 118. The identification device 122 is configured to compute clusters to identify outliers. For example, the query request 107 for determining outlier-based anomaly may be as follows:

```
1 proc p["%sql1erver.exe"] read || write ip i as evt#time
  (10 min)
2 state ss {
3 amt := sum(evt.amount)
4 } group by i.dstip
5 cluster(points=all(ss.amt), distance="ed", method="DBSCAN
  (100000, 5)")
6 alert (cluster.outlier || cluster.size < 5) && ss.amt >
    1000000
7 report i.dstip, ss.amt
```

In other embodiments, the detection device 108 may be configured to utilize the outlier-based anomaly model by aggregation comparison performed by the identification device 122 to determine outlier processes representing risky system behavior. In further embodiments, the detection device 108 may be configured to utilize the outlier-based anomaly model by sorting performed by the identification device 122 to determine outlier processes representing risky system behavior. For example, top sorted results may represent active processes or IP addresses which are be performing potentially risky system behavior.

The system 100 is configured to permit the detection device 108 to perform numerous different queries at the same time in order to provide improved detection of the risky system behavior. For example, a malware attack may cause multiple anomalies in the computer system. A query request that includes a rule-based anomaly model can detect the execution of a password cracking tool. A query request that includes a time-series anomaly model may monitor excessive network accesses. A query request that includes an outlier-based anomaly detection can be used to detect an outlier process that performs excessive dumping of the database.

The detection device 108 is configured to continuously monitor the system event data 105 for many query requests at the same time. If the detection device 108 required a single copy of the system event data for each query request 107 received by the detection device, this would provide a significant demand on the resources of the system 100 and would negatively affect the scalability of the system. In order to reduce the system demands associated with processing concurrent query requests, the system 100 preferably includes an optimization device 124.

The optimization device 124 may include an analysis device 126. The analysis device 126 is configured to analyze the query requests 107 received by the detection device 108. In a preferred embodiment, the analysis device 126 is configured to perform lexical and syntactic analysis of the query requests 107 received by the detection device 108 and construct a parse tree. The analysis device 126 is also configured to perform semantic analysis of the query requests 107 received by the detection device 108. In a preferred embodiment, the analysis device 126 is configured to summarize the query execution information in a generated parse tree in a query execution context.

The optimization device 124 is configured to group the query requests 107 received by the detection device 108 based on the analysis performed by the analysis device 126. The optimization device 124 is then configured to schedule the execution of concurrent query requests 107 received by the detection device 108 in a master-dependent-query scheme. The master-dependent-query scheme identifies compatible queries and groups the queries to use a single copy of the system event data 105.

In a preferred embodiment, for compatible queries that are grouped together by the optimization device the optimization device designates one query request as the master query and the remaining query requests as dependent queries. The detection device 108 is configured so that the master query directly accesses the event stream data. The dependent queries are configured to use the outputs of the mastery query as their inputs for the system event data. This significantly reduces the demands placed on the system 100 for multiple concurrent query requests 107 performed by the detection device 108.

Figure 3:
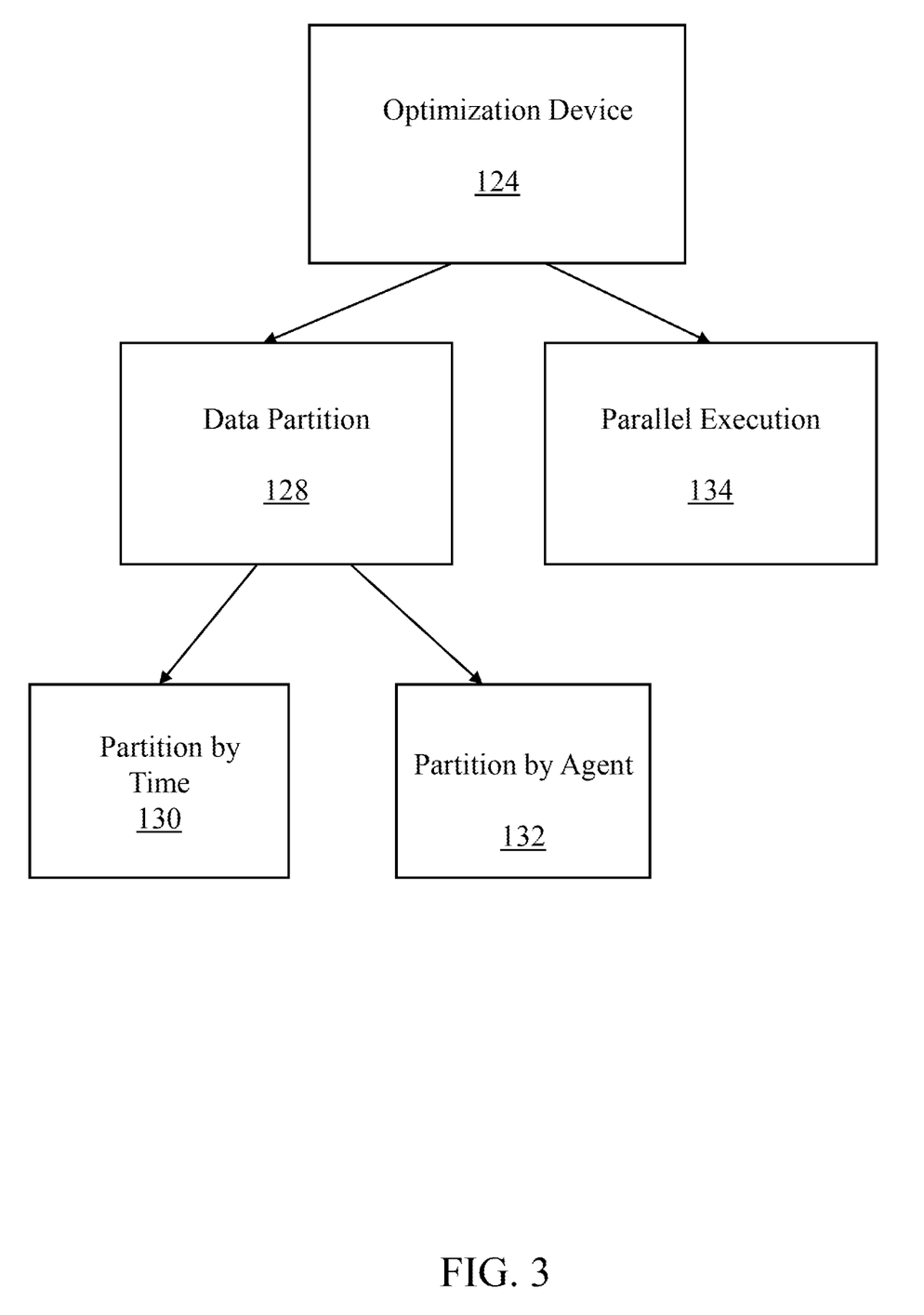
FIG. 3 is a block/flow diagram illustratively depicting performance optimization features provided by the optimization device, in accordance with an embodiment of the present invention.

FIG. 3 shows an illustrative embodiment of the performance optimization provided by the optimization device. The features of the optimization device 124 include data partition 128 wherein groups may be arranged by a common time or agent so that the execution of the query requests by the detection device are partitioned by time 130 or by agent 132. The optimization device 124 also features parallel execution 134 of various different query requests.

In one embodiment, the master-dependent-query scheme may be as follows:

Input: n data queries: Q = {qi \ i ≤ n, i ∈ N+}
n event patterns: E = {ei \ i ≤ n, i ∈ N+}
m event relationships: R = {rel(ei, ej )}

Figure 4:
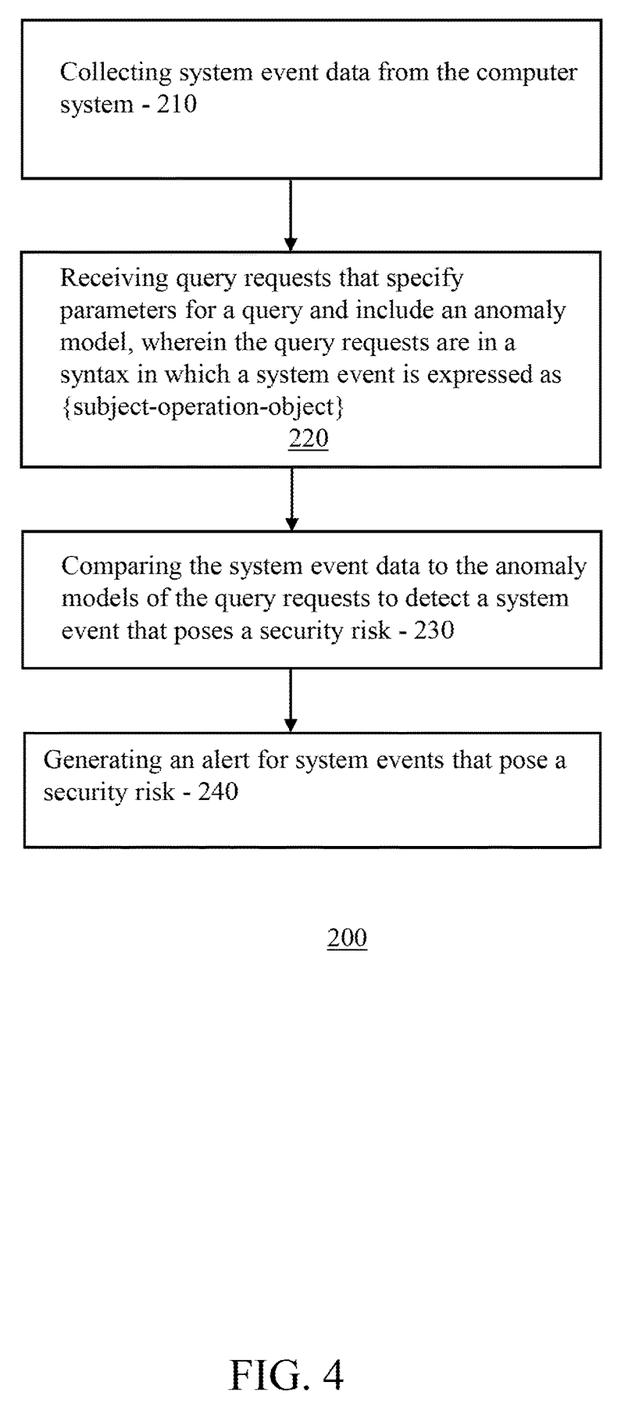
FIG. 4 is a flow diagram showing a method for detecting security risks in a computer system, in accordance with an embodiment of the present invention.

Output: Event ID tuples that satisfy all constraints
1. ∀ei ∈ E, score(ei)
←c-o-m-p-u-t-e ei;
2.Rsorted
←s-o-r-t R;
3. Initialize empty set Exec, empty mapM;
for rel(ei, ej ) in Rsorted do
if ei not in Exec and ej not in Exec then
// Suppose score(ei) ≥ score(ej )
Si
←e-x-ec-u-t-e qi; Exec.add(ei); // Si:event ID set
Sj
←e-x-ec-u-t-e
Si
qj ; Exec.add(ej );
T_ ← Si × Sj|
rel(ei,ej ); // create tuple set from
Si and Sj, then filter by rel(ei, ej )
M.put(ei, T); M.put(ej, T);
else if Either of {ei, ej} in Exec then
// Suppose ei in Exec
Sj
←e-x-ec-u-t-e
Si
qj ; Exec.add(ej );
T ← M.get(ei); T_ ← T × Sj|
rel(ei,ej ); // update
tuple set using Sj and rel(ei, ej )
replaceValues(M, T, T_); M.put(ej, T_);
else
Ti ← M.get(ei); Tj ← M.get(ej );
if Ti = Tj then
T ←Ti|
rel(ei,ej ); // filter tuple set
replaceValues(M, Ti, T_);
else
T_ ← Ti × Tj|
rel(ei,ej ); // merge tuple sets
replaceValues(M, Ti, T_);
replaceValues(M, Tj, T_);
4. for ei ∈ E and ei not in Exec do
Si
←e-x-ec-u-t-e qi; Exec.add(ei); M.put(ei, Si);
5. while unique(M.values( )) > 1 do
Pick Ti, Tj from M.values( ), such that Ti_= Tj ;
T_ ← Ti × Tj ; // merge tuple sets
replaceValues(M, Ti, T_); replaceValues(M, Tj, T_);
6. Return unique(M.values( ));
Function replaceValues (M, T, T')
Replace all values T stored in M with T_;

Referring to FIG. 4, the present invention is also directed to methods 200 for identifying security risks in a computer system as previously described. The methods may be performed by any combination of hardware and/or software.

As shown in FIG. 4, in block 210 system event data is collected from the computer system. In block 220, query requests are received that specify parameters of a query. Each query request includes at least one anomaly model. The query request and the anomaly model are included in a first syntax in which a system event is expressed as {subject-operation-object}.

In block 230 the system event data is compared to the anomaly models of the query requests to detect a system event that poses a security risk. In block 240, an alert for system events that pose a security risk is generated.

As previously described, the query requests may be a single-event query or a multi-event query. In certain embodiments, the anomaly model may be a rule-based anomaly model as previously described. In certain embodiments, the anomaly model may be a time-series anomaly model which may utilize system event data including state data as previously described.

In certain embodiments, the anomaly model may be an invariant-based anomaly model based on a training period as previously described. In certain embodiments, the anomaly model may be an outlier-based anomaly model which determines outliers in system event data, including state data, that is received concerning a plurality of peer processes.

The method may also include the step of optimizing the execution of the query requests as described above. The optimization may include performing semantic, lexical and syntactic analysis of the query requests to group the query. The optimization may also include performing the query requests via a master-dependent-query scheme for a determined group as described above.

While the above configuration and steps are illustratively depicted according to one embodiment of the present principles, it is contemplated that other sorts of configurations and steps may also be employed according to the present principles. While various components have been illustratively described as separate components, the components may be formed in a variety of integrated hardware or software configurations.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for identifying security risks in a computer system, comprising:
an event stream generator configured to collect system event data from the computer system;
a query device configured to receive query requests, each query request including at least one anomaly model, wherein the query request and the anomaly model are specified in a first syntax expressing a system event as {subject-operation-object}, the subject being a system entity of the computer system, the operation being initiated by the subject and targeted on the object;
a detection device configured to receive at least one query request from the query device and continuously compare the system event data in the first syntax to the anomaly models of the query requests to detect a given system event that poses a security risk; and
a reporting device configured to generate an alert for system events that pose a security risk detected by the detection device.

2. The system of claim 1, wherein the query requests include a single-event query.

3. The system of claim 1, wherein the query requests include a multi-event query.

4. The system of claim 1, wherein the query requests include at least one of the following parameters selected from the group consisting of event temporal relationship constraints, system event patterns and global constraints for at least one anomaly model.

5. The system of claim 1, wherein the query requests include a rule-based anomaly model.

6. The system of claim 1, wherein the system further includes a computation device configured to receive the system event data and compute measurements concerning the system event data, including state data.

7. The system of claim 6, wherein:
the query requests include a time-series anomaly model; and
the detection device is configured to receive state data for sliding time windows from the computation device to detect a system event that poses a security risk.

8. The system of claim 6, wherein:
the detection device further includes a training device that is configured to receive a query request that includes an invariant-based anomaly model;
the training device is configured to perform a query during a training period and detect invariants during the training period; and
the detection device is configured to incorporate the invariants detected during the training period in the invariant-based anomaly model.

9. The system of claim 6, wherein:
the query requests include an outlier-based anomaly model;
the detection device is configured to receive state data from the computation device concerning a plurality of peer processes;
the detection device further includes an identification device that is configured to determine outliers in the state data for the plurality of peer processes; and
the detection device is configured to compare the outliers in the state data to the outlier-based anomaly model to detect a system event that poses a security risk.

10. The system of claim 1, wherein:
the system further includes an optimization device that is configured to perform semantic, lexical and syntactic analysis of the query requests to group the query requests; and
the optimization device is configured to schedule the detection device to perform the query requests for a determined group via a master-dependent-query scheme.

11. A computer-implemented method for identifying security risks in a computer system, comprising:
collecting system event data from the computer system; and
receiving query requests, each query request including at least one anomaly model, wherein the query request and the anomaly model are specified in a first syntax expressing a system event as {subject-operation-object}, the subject being a system entity of the computer system, the operation being initiated by the subject and targeted on the object;
comparing the system event data in the first syntax to the anomaly models of the query requests to detect a given system event that poses a security risk; and
generating an alert for system events that pose a security risk.

12. The computer-implemented method of claim 11, wherein the query requests include a single-event query.

13. The computer-implemented method of claim 11, wherein the query requests include a multi-event query.

14. The computer-implemented method of claim 11, wherein the query requests include at least one of the following parameters: event temporal relationship constraints, system event patterns and global constraints for at least one anomaly model.

15. The computer-implemented method of claim 11, wherein the query requests include a rule-based anomaly model.

16. The computer-implemented method of claim 11, further comprising:
 receiving the system event data; and
 computing measurements concerning the system event data, including state data.

17. The computer-implemented method of claim 16, wherein:
 the query requests include a time-series anomaly model; and
 state data for sliding time windows is used as the system event data for the comparing to the anomaly models to detect a system event that poses a security risk.

18. The computer-implemented method of claim 16, further comprising:
 receiving a query request that includes an invariant-based anomaly model;
 performing a query during a training period and detecting invariants during the training period; and
 incorporating the invariants detected during the training period in the invariant-based anomaly model.

19. The computer-implemented method of claim 16, wherein:
 the query requests include an outlier-based anomaly model;
 state data is received concerning a plurality of peer processes;
 outliers in the state data are determined for the plurality of peer processes; and
 the outliers in the state data are compared to the outlier-based anomaly model to detect a system event that poses a security risk.

20. The computer-implemented method of claim 11, further comprising:
 performing semantic, lexical and syntactic analysis of the query requests to group the query; and
 performing the query requests via a master-dependent-query scheme for a determined group.

* * * * *